United States Patent Office 3,275,679
Patented Sept. 27, 1966

3,275,679
BIS(ISOCYANOTOALKYL OR PHENYL) TRANS-9, 10-DIHYDROANTHRACENE 9,10-ENDO α,β-SUCCINATES
Thomas K. Brotherton and John W. Lynn, Charleston, and Robert J. Knopf, St. Albans, W. Va., assignors to Union Carbide Corporation, a corporation of New York
No Drawing. Filed Jan. 25, 1963, Ser. No. 256,495
3 Claims. (Cl. 260—475)

This invention relates to novel ester isocyanates and to a process for their preparation. In one aspect, this invention relates to a novel class of ester having at least two isocyanate groups. In a further aspect, this invention relates to the reaction products of olefinically unsaturated ester isocyanates and drying oils which can be conveniently cured to hard, tough, transparent coatings.

The ester isocyanate compounds which can be prepared by the process of this invention can be conveniently represented by the following general formula:

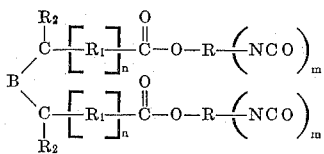

wherein B represents a divalent organic group composed of at least two members selected from the group consisting of carbon, hydrogen and oxygen, at least two of said members being carbon and hydrogen, and wherein B contains a 2-butylene group which forms a six-membered ring with the carbon atoms to which it is attached; R represents a divalent aliphatic, alicyclic or aromatic group; $R_1$ represents a divalent aliphatic group; $R_2$ represents hydrogen, alkyl, or both $R_2$'s taken together can form a single bond; $n$ has a value of zero or 1; and $m$ is a whole positive integer of from 1 to 3. Preferred compounds are those wherein B contains from 4 to 90 carbon atoms, more preferably from 4 to 24 carbon atoms, and is free of acetylenic unsaturation; R and $R_1$ represent divalent hydrocarbon groups containing from 2 to 24 carbon atoms; $R_2$ represents hydrogen or a double bond between the carbon atoms when both $R_2$'s are taken together; and $n$ and $m$ are as previously indicated. Particularly preferred compounds represented by the aforesaid formula are those wherein B represents a 2-butenylene group; R represents a member selected from the group consisting of alkylene, alkenylene, alkynylene, arylene, arylenealkyl, alkylenearyl, alkarylene, aryleneal- kenyl, alkenylenearyl, arylenealkynyl, alkynylenearyl, cycloalkylene, cycloalkenylene, alkylcycloalkylene, alkylcycloalkenylene, cycloalkylenealkyl and cycloalkylenealkyl groups containing from 2 to 12 carbon atoms; $R_1$ represents an alkenylene group containing from 2 to 18 carbon atoms and more preferably from 2 to 10 carbon atoms; $R_2$ represents hydrogen; $n$ is zero and $m$ is 1.

In one aspect, the novel ester isocyanates which can be prepared by the process of the present invention are those represented by the formula:

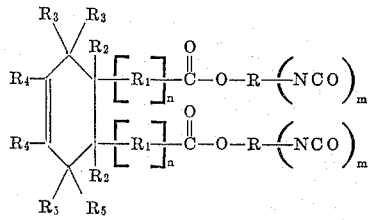

wherein R, $R_1$, $R_2$, $n$ and $m$ are as previously indicated; $R_3$, $R_4$ and $R_5$ represent hydrogen, hydrocarbon groups; or one $R_3$ and one $R_5$ taken together can form a methylene, phenylene, or oxo bridge; and the $R_4$'s can together form part of the same-six-membered cycloaliphatic or aromatic ring.

Illustrative compounds encompassed by the aforementioned formulae and which can be prepared by the process of the instant invention include, among others, bis(2-isocyanatoethyl) 4-cyclohexene-1,2-dicarboxylate, bis(2-isocyanatoethyl) 5-norbornene-2,3-dicarboxylate, bis(2-isocyanatoethyl) trans-9,10-dihydroanthracene-9,10-endo-α, β-succinate, bis(4-isocyanatophenyl) 4-methylcyclohex-4-ene-1,2-dicarboxylate, bis(3-isocyanatopropyl) 3,6-endo-oxo - 4 - cyclohexene - 1,2 - dicarboxylate, 2,3 - bis(3-isocyanatopropylcarboxymethyl) - 5 - methyl - 5 - norbornene, bis(2-isocyanatoethyl) 2,5-norbornadiene-2,3-dicarboxylate, and the like.

The isocyanates are very reactive materials which condense readily with active hydrogen-containing compounds such as alcohols, amines, carboxylic acids, amides, and water to form the corresponding carbamates, ureas, and the like. Isocyanate-containing compounds have been found particularly useful in the preparation of urethane foams, fibers, films, coatings, elastomers, and castings. For example, the polyisocyanates are useful in the preparation of flexible, high molecular weight polymers by incorporating the polyisocyanate with flexible resins such as polyether glycols. Moreover, since the compositions of this invention are polyfunctional, in that each compound contains at least two isocyanate groups in the molecule they are particularly useful in those fields of application wherein polyisocyanates have been utilized.

It is therefore an object of the present invention to provide novel isocyanates which are suitable for use in the plastic and resin field. Another object is to provide new compositions of matter comprising cyclic, bicyclic, and heterocyclic aliphatic ester isocyanates. Another object of this invention is to provide novel esters containing at least two isocyanate groups. A still further object of the present invention is to provide novel compounds having polyfunctional properties. A further object of this invention is to provide novel reaction products of olefinically unsaturated ester isocyanates and drying oils which can be conveniently cured to hard, tough, transparent coatings. Another object of the present invention is to provide a novel process for the preparation of the aforesaid compositions. These and other objects will readily become apparent to those skilled in the art in the light of the teachings herein set forth.

In its broad aspect, this invention is directed to novel ester isocyanates of the aforementioned general formula and to the process for their preparation. These novel compositions are multifunctional in nature in that each compound is characterized by the presence of at least two isocyanate groups and at least one olefinically unsaturated group in the cyclic moiety of the molecule.

In one embodiment, the present invention is directed to novel cyclic ester isocyanates represented by the formula:

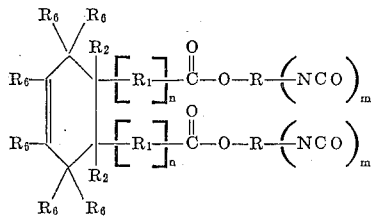

wherein R, $R_1$, $R_2$, $n$ and $m$ have the same value as previously indicated and $R_6$ represents hydrogen or lower alkyl. Particularly preferred compounds within this embodiment are those represented by the above formula wherein $n$ is zero, $m$ is 1, $R_2$ is hydrogen, and $R_6$ is hydrogen or lower alkyl of from 1 to 6 carbon atoms.

Illustrative novel cyclic ester isocyanates within this embodiment include, among others, the following: the bis(isocyanatoalkyl) 4-cyclohexene-1,2-dicarboxylates, e.g.,
bis(2-isocyanatoethyl) 4-cyclohexene-1,2-dicarboxylate,
bis(4-isocyanatobutyl) 4-cyclohexene-1,2-dicarboxylate,
bis(9-isocyanatononyl) 4-cyclohexene-1,2-dicarboxylate,
bis(10-isocyanatodecyl) 4-cyclohexene-1,2-dicarboxylate,
bis(14-isocyanatotetradecyl) 4-cyclohexene-1,2-dicarboxylate,
bis(18-isocyanatooctadecyl) 4-cyclohexene-1,2-dicarboxylate,
bis(24-isocyanatotetracosyl) 4-cyclohexene-1,2-dicarboxylate,
bis(2,4-diisocyanatobutyl) 4-cyclohexene-1,2-dicarboxylate,
bis(6,10-diisocyanatodecyl) 4-cyclohexene-1,2-dicarboxylate,
bis(6,12,18-triisocyanatooctadecyl) 4-cyclohexene-1,2-dicarboxylate; the
bis(isocyanatoalkenyl) 4-cyclohexene-1,2-dicarboxylates, e.g.,
bis(4-isocyanatobut-2-enyl) 4-cyclohexene-1,2-dicarboxylate,
bis(8-isocyanatooct-4-enyl) 4-cyclohexene-1,2-dicarboxylate,
bis(12-isocyanatododec-5-enyl) 4-cyclohexene-1,2-dicarboxylate,
bis(19-isocyanatononadec-10-enyl) 4-cyclohexene-1,2-dicarboxylate,
bis(8,10-diisocyanatooctadec-4-enyl) 4-cyclohexene-1,2-dicarboxylate,
bis(12,17-diisocyanatoeicos-8-enyl) 4-cyclohexene-1,2-dicarboxylate,
bis(10,15,24-triisocyanatotetracos-8-enyl) 4-cyclohexene-1,2-dicarboxylate; the
bis(isocyanatocycloalkyl) 4-cyclohexene-1,2-dicarboxylates, e.g.,
bis(4-isocyanatocyclohexyl) 4-cyclohexene-1,2-dicarboxylate,
bis(3,5-diisocyanatocyclohexyl) 4-cyclohexene-1,2-dicarboxylate,
bis(2,4,6-triisocyanatocyclohexyl) 4-cyclohexene-1,2-dicarboxylate; the
bis(isocyanatocycloalkenyl) 4-cyclohexene-1,2-dicarboxylates, e.g.,
bis(4-isocyanatocyclohex-2-enyl) 4-cyclohexene-1,2-dicarboxylate,
bis(3,5-diisocyanatocyclohex-2-enyl) 4-cyclohexene-1,2-dicarboxylate; the
bis(isocyanatoalkylcycloalkyl) 4-cyclohexene-1,2-dicarboxylates, e.g.,
bis[4-(3-isocyanatopropyl)cyclohexyl] 4-cyclohexene-1,2-dicarboxylate,
bis[5-(8-isocyanatooctyl)cycloheptyl] 4-cyclohexene-1,2-dicarboxylate; the
bis(isocyanatoalkylcycloalkenyl) 4-cyclohexene-1,2-dicarboxylates, e.g.,
bis[4-(4-isocyanatobutyl)cyclohex-2-enyl] 4-cyclohexene-1,2-dicarboxylate; the
bis(isocyanatoalkenylcycloalkyl) 4-cyclohexene-1,2-dicarboxylates, e.g.,
bis-[4-(5-isocyanatopent-3-enyl)cyclohexyl] 4-cyclohexene-1,2-dicarboxylate; the
bis(alkyl-substituted isocyanatocycloalkyl) 4-cyclohexene-1,2-dicarboxylates, e.g.
bis(3-methyl-4-isocyanatocyclohexyl) 4-cyclohexene-1,2-dicarboxylate,
bis(2,6-dimethyl-4-isocyanatocyclohexyl) 4-cyclohexene-1,2-dicarboxylate; the
bis(isocyanatoaryl) 4-cyclohexene-1,2-dicarboxylates, e.g.,
bis(4-isocyanatophenyl) 4-cyclohexene-1,2-dicarboxylate,
bis(2,6-diisocyanatophenyl) 4-cyclohexene-1,2-dicarboxylate; the
bis(alkyl-substituted isocyanatoaryl) 4-cyclohexene-1,2-dicarboxylates, e.g.,
bis(4-isocyanato-2,6-dimethylphenyl) 4-cyclohexene-1,2-dicarboxylate,
bis(2,6-diisocyanato-4-ethylphenyl) 4-cyclohexene-1,2-dicarboxylate; the
alkyl-substituted bis(isocyanatohydrocarbyl) 4-cyclohexene-1,2-dicarboxylates, e.g.,
bis(4-isocyanatophenyl) 5-methylcyclohex-4-ene-1,2-dicarboxylate,
bis(2-isocyanatoethyl) 4-ethylcyclohex-4-ene-1,2-dicarboxylate; the
1,2-bis(isocyanatohydrocarbyloxycarbonylalkyl)cyclohex-4-enes, e.g.,
1,2-bis(3-isocyanatopropoxycarbonylmethyl)cyclohex-4-ene; the
bis(isocyanatohydrocarbyl) cyclohexa-1,4-diene-1,2-dicarboxylates, e.g.,
bis(isocyanatoethyl) cyclohexa-1,4-diene-1,2-dicarboxylate, and the like.

In a second embodiment, the present invention encompasses the novel bicyclic ester isocyanates represented by the formula:

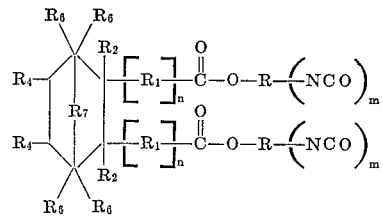

wherein R, $R_1$, $R_2$, $R_4$, $R_6$ and $n$ and $m$ are as previously defined and $R_7$ represents a methylene or 1,2-phenylene group. Preferred compounds within this embodiment are those wherein $n$ is zero, $m$ is 1, $R_2$ is hydrogen and $R_4$ and $R_6$ are hydrogen or lower alkyl.

Illustrative novel compositions within this embodiment include, among others, the bis(isocyanatoalkyl) 5-norbornene-2,3-dicarboxylates, e.g.,
bis(2-isocyanatoethyl) 5-norbornene-2,3-dicarboxylate,
bis(4-isocyanatobutyl) 5-norbornene-2,3-dicarboxylate,
bis(10-isocyanatodecyl) 5-norbornene-2,3-dicarboxylate, bis(18-isocyanatooctadecyl) 5-norbornene-2,3-dicarboxylate,
bis(24-isocyanatotetracosyl) 5-norbornene-2,3-dicarboxylate,
bis(2,4-diisocyanatobutyl) 5-norbornene-2,3-dicarboxylate,
bis(6,12,18-triisocyanatooctadecyl) 5-norbornene-2,3-dicarboxylate;
the bis(isocyanatoalkyl) trans-9,10-dihydroanthracene-9,10-endo-$\alpha,\beta$-succinates, e.g.,
bis(2-isocyanatoethyl) trans-9,10-dihydroanthracene-9,10-endo-$\alpha,\beta$-succinate,
bis(10-isocyanatodecyl) trans-9,10-dihydroanthracene-9,10-endo-$\alpha,\beta$-succinate,
bis(24-isocyanatotetracosyl) trans-9,10-dihydroanthracene-9,10-endo-$\alpha,\beta$-succinate,
bis(4,4-diisocyanatobutyl) trans-9,10-dihydroanthracene 9,10-endo-$\alpha,\beta$-succinate,
the bis(isocyanatoalkenyl) 5-norbornene-2,3-dicarboxylates, e.g.,
bis(4-isocyanatobut-2-enyl) 5-norbornene-2,3-dicarboxylate,
bis(12-isocyanatododec-5-enyl) 5-norbornene-2,3-dicarboxylate,
bis(8,10-diisocyanatooctadec-4-enyl) 5-norbornene-2,3-dicarboxylate;
the bis(isocyanatoalkenyl) trans-9,10-dihydroanthracene 9,10-endo-$\alpha,\beta$-succinates, e.g.,
bis(5-isocyanatopent-2-enyl) trans-9,10-dihydroanthracene 9,10-endo-$\alpha,\beta$-succinate,
bis(19-isocyanatononadec-10-enyl) trans-9,10-dihydroanthracene 9,10-endo-$\alpha,\beta$-succinate;
the bis(isocyanatocycloalkyl) 5-norbornene-2,3-dicarboxylates, e.g.,
bis(4-isocyanatocyclohexyl) 5-norbornene-2,3-dicarboxylate,
bis(3,5-diisocyanatocyclohexyl) 5-norbornene-2,3-dicarboxylate;
the bis(isocyanatocycloalkyl) trans-9,10-dihydroanthracene 9,10-endo-$\alpha,\beta$-succinates, e.g.,
bis(24-isocyanatocyclohexyl) trans-9,10-dihydroanthracene 9,10-endo-$\alpha,\beta$-succinate,
bis(2-methyl-3,5-diisocyanatocyclohexyl) trans-9,10-dihydroanthracene 9,10-endo-$\alpha,\beta$-succinate,
the bis(isocyanatoaryl) 5-norbornene-2,3-dicarboxylates, e.g.,
bis(4-isocyanatophenyl) 5-norbornene-2,3-dicarboxylate,
bis(2-isocyanatonaphthyl) 5-norbornene-2,3-dicarboxylate,
bis(3,5-diisocyanatophenyl) 5-norbornene-2,3-dicarboxylate;
the bis(isocyanatoaryl) trans-9,10-dihydroanthracene 9,10-endo-$\alpha,\beta$-succinates, e.g.,
bis(4-isocyanatophenyl) trans-9,10-dihydroanthracene 9,10-endo-$\alpha,\beta$-succinate;
the bis(isocyanatohydrocarbyl) 2,5-norbornadiene-2,3-dicarboxylates, e.g.,
bis(2-isocyanatoethyl) 2,5-norbornadiene-2,3-dicarboxylate,
bis(4-isocyanatophenyl) 2,5-norbornadiene-2,3-dicarboxylate;
the 2,3-bis(isocyanatohydrocarbyloxycarbonylalkyl) 5-norbornene, e.g.,
2,3-bis(2-isocyanatoethoxycarbonylmethyl) 5-norbornene,
2,3-bis(2-isocyanatoethoxycarbonylmethyl) 2,5-norbornadiene,
the alkyl-substituted bis(isocyanatohydrocarbyl) 5-norbornene-2,3-dicarboxylates, e.g.,
bis(2-isocyanatoethyl) 1,4-dimethyl-5-norbornene-2,3-dicarboxylate, and the like.

A third embodiment of the present invention is directed to novel heterocyclic ester isocyanates. The compositions of this embodiment of the invention can be represented by the formula:

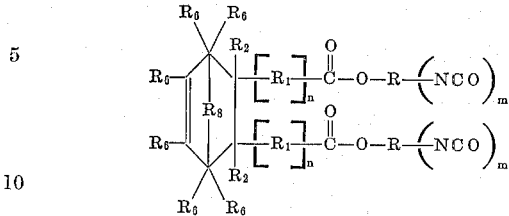

where $n$, $m$, R, $R_1$, $R_2$, and $R_6$ are as previously indicated and $R_8$ represents divalent oxygen. Preferred compounds within this embodiment are those wherein $n$ is zero, $m$ is 1, $R_2$ is hydrogen, and $R_6$ is hydrogen or lower alkyl of from 1 to 6 carbon atoms.

Typical heterocyclic ester isocyanates within this embodiment include: the bis(isocyanatohydrocarbyl) 3,6-endo-oxo-4-cyclohexene-1,2-dicarboxylates, e.g.,
bis(2-isocyanatoethyl) 3,6-endo-oxo-4-cyclohexene-1,2-dicarboxylate,
bis(2-isocyanatopropyl) 3,6-endo-oxo-4-cyclohexene-1,2-dicarboxylate,
bis(4-isocyanatobutyl) 3,6-endo-oxo-4-cyclohexene-1,2-dicarboxylate,
bis(6-isocyanatohexyl) 3,6-endo-oxo-4-cyclohexene-1,2-dicarboxylate,
bis(9-isocyanatononyl) 3,6-endo-oxo-4-cyclohexene-1,2-dicarboxylate,
bis(18-isocyanatooctadecyl) 3,6-endo-oxo-4-cyclohexene-1,2-dicarboxylate,
bis(5-isocyanatopent-2-enyl) 3,6-endo-oxo-4-cyclohexene-1,2-dicarboxylate,
bis(6-isocyanatohex-3-enyl) 3,6-endo-oxo-4-cyclohexene-1,2-dicarboxylate,
bis(8-isocyanatooct-4-enyl) 3,6-endo-oxo-4-cyclohexene-1,2-dicarboxylate,
bis(9-isocyanatonon-5-enyl) 3,6-endo-oxo-4-cyclohexene-1,2-dicarboxylate,
bis(18-isocyanatooctadec-10-enyl) 3,6-endo-oxo-4-cyclohexene-1,2-dicarboxylate,
bis(4-isocyanatophenyl) 3,6-endo-oxo-4-cyclohexene-1,2-dicarboxylate,
bis(2,4-diisocyanatophenyl) 3,6-endo-oxo-4-cyclohexene-1,2-dicarboxylate,
bis(3,5-diisocyanatophenyl) 3,6-endo-oxo-4-cyclohexene-1,2-dicarboxylate,
bis(4-methyl-3,5-diisocyanatophenyl) 3,6-endo-oxo-4-cyclohexene-1,2-dicarboxylate,
bis(4-isocyanatocyclohexyl) 3,6-endo-oxo-4-cyclohexene-1,2-dicarboxylate;
the bis(4-isocyanatohydrocarbyl) 3,6-endo-oxo-1,4-cyclohexadiene-1,2-dicarboxylates, e.g.,
bis(2-isocyanatoethyl) 3,6-endo-oxo-1,4-cyclohexadiene-1,2-dicarboxylate,
bis(4-isocyanatocyclohexyl) 3,6-endo-oxo-1,4-cyclohexadiene-1,2-dicarboxylate,
bis(4-isocyanatophenyl) 3,6-endo-oxo-1,4-cyclohexadiene-1,2-dicarboxylate,
bis(2,4-diisocyanatophenyl) 3,6-endo-oxo-1,4-cyclohexadiene-1,2-dicarboxylate,
bis(3,5-diisocyanatophenyl) 3,6-endo-oxo-1,4-cyclohexadiene-1,2-dicarboxylate,
bis(2,6-dimethyl-4-isocyanatophenyl) 3,6-endo-oxo-1,4-cyclohexadiene-1,2-dicarboxylate,
bis(4-methyl-2,6-diisocyanatophenyl) 3,6-endo-oxo-1,4-cyclohexadiene-1,2-dicarboxylate, and the like.

A fourth embodiment of the present invention is directed to novel ester isocyanates of the aforementioned general formula which are derived by the Diels-Alder reaction of a drying oil with an olefinically unsaturated ester isocyanate. Thus the group B of the general formula represents the residue of a triglyceride of unsaturated fatty acids and can contain one or more of the ester isocyanate groups indicated. Hence, the novel compositions of this embodiment are mixed triglycerides of unsaturated fatty acids wherein at least one conjugated system in the acid moiety, i.e., —CH=CH—CH=CH— has been converted to the unit:

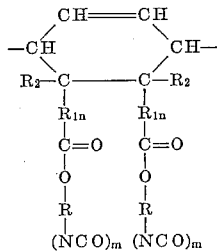

wherein R, $R_1$, $R_2$, $n$ and $m$ have the same values as previously indicated.

The novel ester isocyanates of the aforementioned embodiments can be conveniently prepared by the Diels-Alder reaction of an appropriate diene and an olefinically unsaturated ester isocyanate. In general, the dienes which can be employed in the preparation of the novel compositions include those represented by the formula:

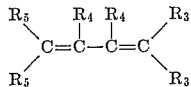

wherein $R_3$–$R_5$ have the same value as previously indicated. Illustrative dienes include, among others, 1,3-butadiene, 2-methyl-1,3-butadiene, 2,3-dimethyl-1,3-butadiene, 1,3-pentadiene, 2-methyl-1,3-pentadiene, 2,4-hexadiene, 2,3-dimethyl-2,4-hexadiene, 1,3-hexadiene, 1,3-octadiene, 3,5-octadiene, 2-methyl-3,4-octadiene, 1,3-nonadiene, 4,6-nonadiene, 5,6-dimethyl-4,6-nonadiene, 1,3-decadiene, 3,5-decadiene, 1,3-tetradecadiene, 3,5-tetradecadiene, 1,3-nonadecadiene, 10,12-tetracosadiene, cyclopentadiene, methylcyclopentadiene, propylcyclopentadiene, anthracene, furan, and the like.

For the novel compositions of the fourth embodiment of the present invention, the diene starting material is an unsaturated aliphatic compound having a diene value, as hereinafter defined, of from 5 to 70, and more preferably from 20 to 65, and which does not contain groups which would adversely affect the Diels-Alder reaction. Particularly preferred dienes are the triglycerides of fatty acids having at least one conjugated system in the acid moiety of the triglyceride. The triglycerides, or drying oils, which are suitable for use in the preparation of the compositions of the instant invention are marine and vegetable oils possessing conjugated unsaturation, or unsaturation capable of undergoing a Diels-Alder reaction with a dienophile, e.g., non-conjugated unsaturation which can rearrange to the conjugated form during the reaction. Hence, the term "drying oil," as employed throughout the instant disclosure and appended claims, is intended to encompass oils possessing both the conjugated and non-conjugated type of unsaturation. The natural oils which are obtained from the seeds and nuts of certain plants and trees, and from a few species of fish, are particularly suited for use in the instant compositions. These oils can be further defined as drying or semidrying oils and are composed largely of triglycerides of the long-chain unsaturated fatty acids containing from 18 to 22 carbon atoms and 2 or more double bonds per chain. Eleostearic acid and licanic acid which are found in the normally abundant, natural occurring oils, e.g., tung oil (China wood) and oiticica oil, are typical acids having double bonds in a conjugated position. Typical drying oils which can be conveniently employed in the curable compositions of the instant invention include, among others, corn oil, linseed oil, perilla oil, poppyseed oil, safflower seed oil, soybean oil, sunflower seed oil, tall oil, tung oil, herring oil, menhaden oil, sardine oil, oiticica oil, dehydrated castor oil and the like.

Unsaturated ester isocyanates which can be employed as the dienophillic component in the Diels-Alder reaction can be conveniently represented by the formula:

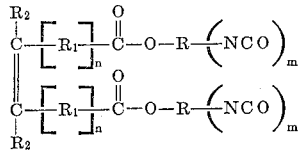

wherein R, $R_1$, $R_2$, $n$ and $m$ are as previously indicated. Illustrative compounds encompassed by the above formula include bis(2-isocyanatoethyl) fumarate,
bis(3-isocyanatopropyl) glutaconate,
bis(4-isocyanatobutyl) alpha-hydromuconate,
bis(5-isocyanatopentyl) beta-hydromuconate,
bis(7-isocyanatoheptyl) itaconate,
bis(2,2-dimethyl-3-isocyanatopropyl) fumarate,
bis(3-ethyl-5-isocyanatopentyl) glutaconate,
bis(3,4-diethyl-5-isocyanatopentyl) alpha-hydromuconate,
bis(4,4-dimethyl-6-isocyanatohexyl) beta-hydromuconate,
bis(2-methyl-4-ethyl-6-isocyanatohexyl) itaconate,
bis(9-isocyanatononyl) fumarate,
bis(5,6,7-triethyl-9-isocyanatononyl) fumarate,
2-isocyanatoethyl 3-isocyanatopropyl glutaconate,
4-isocyanatobutyl 6-isocyanatohexyl alpha-hydromuconate,
3-isocyanatopropyl 8-isocyanatooctyl beta-hydromuconate,
5-isocyanatopentyl 6-isocyanatohexyl itaconate,
2-methyl-3-isocyanatopropyl 2-isocyanatoethyl fumarate,
4-ethyl-7-isocyanatoheptyl 6-isocyanatohexyl fumarate,
bis(2-isocyanatoethyl) acetylenedicarboxylate,
bis(4-isocyanato-2-butenyl) glutaconate,
bis(4-isocyanato-2-butenyl) itaconate,
bis(5-isocyanato-3-pentenyl) fumarate,
bis(7-isocyanato-4-heptenyl) fumarate,
bis(8-isocyanato-4-octenyl) glutaconate,
bis(9-isocyanato-5-nonenyl) itaconate,
bis(10-isocyanato-6-decenyl) fumarate,
bis(3-ethyl-5-isocyanato-3-pentenyl) fumarate,
bis(3,4-dimethyl-5-isocyanato-3-pentenyl) glutaconate,
bis(2-methyl-4-ethyl-6-isocyanato-2-hexyl) itaconate,
bis(5,6,7-triethyl-9-isocyanato-4-nonenyl) glutaconate,
4-isocyanato-2-butenyl 3-isocyanatopropyl fumarate,
4-isocyanato-2-butenyl 5-isocyanato-3-pentenyl glutaconate,
4-ethyl-7-isocyanato-5-heptenyl 6-isocyanato-3-hexenyl itaconate,
bis(5-isocyanato-2-butynyl) glutaconate,
bis(7-isocyanato-4-heptynyl) fumarate,
bis(10-isocyanato-4-decynyl) glutaconate,
bis(9-isocyanato-5-nonynyl) itaconate,
bis(2-phenyl-3-isocyanatopropyl) fumarate,
bis(3-naphthyl-5-isocyanatopentyl) fumarate,
bis(3-styryl-5-isocyanatopentyl) glutaconate,
bis(4-tolyl-6-isocyanatohexyl) itaconate,
bis(6-cumenyl-7-isocyanatoheptyl) glutaconate,
bis(5-xylyl-8-isocyanatooctyl) fumarate,
bis(7-mesityl-9-isocyanatononyl) glutaconate,
bis(2-cyclohexyl-3-isocyanatopropyl) itaconate,
bis(3-cyclohexyl-5-isocyanatopentyl) fumarate,
bis(4-cyclohexyl-6-isocyanatohexyl) fumarate,
bis(5-cyclohexylmethyl-7-isocyanatoheptyl) glutaconate,
bis(3-cycloheptyl-5-isocyanatopentyl) itaconate,
bis(3-cyclohexenyl-5-isocyanatopentyl) glutaconate,
bis(5-cyclohepenylmethyl-8-isocyanatooctyl) fumarate,
bis(2-isocyanatocyclobutyl) maleate,
bis(3-isocyanatocyclopentyl) fumarate,
bis(4-isocyanatocyclohexyl) glutaconate,
bis(5-isocyanatocycloheptyl) itaconate,
bis(7-isocyanatocyclononyl) alpha-hydromuconate,
bis(3-isocyanato-4-cyclopentenyl) beta-hydromuconate,
bis(5-isocyanato-6-cycloheptenyl) maleate,
bis(6-isocyanato-7-cyclooctenyl) fumarate,
bis(2-isocyanatocyclobutylmethyl) glutaconate, bis(2-isocyanato-2-ethylcyclobutyl) itaconate,
bis[2(2'-isocyanatoethyl)cyclobutyl] maleate,
bis(3-isocyanatocyclopentylmethyl) fumarate,
bis(3-isocyanato-2-ethylcyclopentyl) glutaconate,
bis[3(2'-isocyanatoethyl)cyclopentyl] itaconate,
bis(5-isocyanatocycloheptylmethyl) maleate,
bis(3-isocyanato-5-methylcyclohexyl) fumarate,
bis(3-isocyanato-5,6-dimethylcyclohexyl) glutaconate,
bis(3-isocyanato-4-ethylcyclopentyl) itaconate,
bis(3-isocyanato-4,5-diethylcyclopentyl) fumarate,
and the like.

Bis(4-isocyanatophenyl) maleate, bis(2-isocyanatophenyl) fumarate, bis(3-isocyanatophenyl) glutaconate, bis(7-isocyanato-2-naphthyl) alpha-hydromuconate, bis(7-isocyanato-1-naphthyl) beta-hydromuconate, bis(4'-isocyanato-4-biphenylyl) itaconate,
bis(5-isocyanato-2-indenyl) maleate,
bis(4-isocyanatobenzyl) fumarate,
bis(4-isocyanatophenylethyl) glutaconate,
bis(7-isocyanato-2-naphthylmethyl) itaconate,
bis[4(3'-isocyanatopropyl)phenyl] maleate,
bis(4-isocyanatomethylphenyl) fumarate,
bis[2(3'-isocyanatopropyl)naphthyl] glutaconate,
bis(4-isocyanato-2-methylphenyl) alpha-hydromuconate,
bis(6-isocyanato-2,4-xylyl) maleate,
bis(4-isocyanato-3-cumenyl) fumarate,
bis(4-isocyanato-2-methoxyphenyl) glutaconate,
bis(4-isocyanatostyryl) itaconate,
bis(4-isocyanatocinnamyl) fumarate,
bis[4(4'-isocyanato-2'-butenyl)phenyl] glutaconate,
and the like.

Although the preferred diisocyanates of this invention contain no elements other than carbon, hydrogen, oxygen and nitrogen, the molecule can be substituted with various organic and inorganic radicals containing such groups as ether, sulfide, polysulfide, sulfone, sulfoxide, ester, nitro, nitrile, and carbonate groups.

The olefinically unsaturated isocyanates which are employed in preparing the novel compositions of this invention are themselves prepared by the reaction of the corresponding ester diamine dihydrohalide with a carbonyl dihalide. The preparation of the olefinically unsaturated ester isocyanates such is bis(2-isocyanatoethyl) fumarate, bis (4-isocyanatophenyl) fumarate, and the like, is the subject matter of an application entitled, "Novel Olefinically Unsaturated Diisocyanates and Process for Preparation," by T. K. Brotherton and J. W. Lynn, Serial No. 212,480, filed July 25, 1962, now abandoned, and assigned to the same assignee as the instant invention.

In general, the conversion of the ester diamine or ester diamine salt to the ester diisocyanate is accomplished by sparging a carbonyl dihalide, more preferably phosgene, through a slurry of the ester diamine or the ester diamine dihydrohalide contained in an inert, normally liquid reaction medium at a temperature within the range of from about 100° to about 225° C., more preferably from about 125° C. to about 170° C., and thereafter recovering the ester diisocyanate. In either instance, it is believed that the intermediate carbamoyl chloride is first formed from the free amine and subsequently thermally degraded to the diisocyanate at the reaction temperature employed. The process can be conducted in either a batch type or continuous reactor.

The preparation of the olefinically unsaturated ester diamines, and their hydrohalides, such as bis(2-aminoethyl) fumarate, bis(2-aminoethyl) fumarate dihydrohalide, bis(4-aminophenyl) fumarate dihydrohalide and the like is the subject matter of an application entitled "Novel Amino Esters of Olefinically Unsaturated Polycarboxylic Acids and Process for Preparation," by T. K. Brotherton and J. W. Lynn, Serial No. 212,481, filed July 25, 1962, now abandoned, and assigned to the same assignee as the instant invention.

The starting materials are prepared, as indicated in the examples, and in the aforementioned copending application, by the reaction of an olefinically unsaturated polycarboxylic acid halide, such as fumaryl chloride, and a hydroxy amine hydrohalide, such as monoethanolamine hydrohalide, at a temperature of from about 65° to about 95° C., for several hours. The ester diamine dihydrohalide is then isolated, as for example, by filtration and then washed and dried. By the aforementioned process the ester diamine dihydrohalides can be obtained in yields of about 95 percent and higher. For further information regarding the production of the ester diamines and their hydrohalides, reference is hereby made to the disclosure of the aforementioned application.

In practice, the preparation of the novel compositions of the aforementioned embodiments of this invention can be effected by the reaction of the appropriate 1,3-diene and the olefinically unsaturated ester isocyanate at a temperature of from about 50° C. to about 250° C., and more preferably from about 75° C. to about 200° C. for a period of time sufficient to form the composition. Depending upon the choice of reactants and temperature employed, the reaction period may vary from as little as about 1 hour, or less, to about 100 hours, or longer.

The mole ratio of diene to the olefinically unsaturated ester isocyanate can vary over a considerable range. For example, a mole ratio of diene to dienophile of from about 0.1:1.0 to about 10:1.0 and more preferably from about 1.0 to 4.0:1.0 can be employed. The pressure employed in the instant process is not necessarily critical and the reaction can be effected at atmospheric, subatmospheric or superatmospheric pressures.

In the same instances, it may be desirable to conduct the reaction in the presence of an inert, normally liquid organic solvent, although the use of a solvent is not required. Suitable solvents include, among others, aromatic hydrocarbons, such as, toluene, xylene, benzene, naphthalene, diphenyl, amylbenzene; cycloaliphatic hydrocarbons, such as, cyclohexane, heptylcyclopentane; the chlorinated aromatic hydrocarbons, such as, chlorobenzene, ortho-dichlorobenzene; and the like.

While reaction temperatures within the aforementioned range of from about 50° C. to about 250° C., have been found desirable, temperatures above and below this range can also be employed. However, from economic consideration the optimum yield and rate of reaction are attained within the aforesaid range. The particular temperature employed will be dependent, in part, upon the diene and dienophillic starting material. Recovery of the desired reaction product can be effected by one of many common techniques such as filtration, distillation, extraction, vacuum sublimation, and the like.

As hereinbefore indicated, a particularly unique embodiment of the present invention is directed to the use of various drying oils as dienes in the Diels-Alder reaction with the olefinically unsaturated isocyanates. The compounds obtained therefrom are characterized by pendant isocyanate groups and thus provide moisture curable, oil modified urethane coatings having outstanding physical properties. These moisture cured urethanes give clear mar resistant, flexible coatings which are particularly suitable in the leather industry and other places where tough flexible coatings are required.

These compositions are outstanding because they have a wide range of compatibility, impart improved caustic, water, and chemical resistance, and they impart improved flexibility and toughness. The compositions are capable of "drying" or curing to excellent protective coatings, with or without the application of heat or catalysts. However, in some instances it is desirable to employ various metallic salts of organic compounds known to the art as "driers" to accelerate the drying process. The drying can be accomplished at temperatures in the range of from about 10° to about 250° C. and for a period of time sufficient to produce the desired property in the coating. The concentration of the drier compound can range from about 0.001 to about 5.0 weight percent, and higher, based on the weight of the modified compound. Suitable driers include soluble compounds containing heavy metals, e.g., cobalt, lead, manganese, calcium, zinc, iron, and the like. Examples of such driers include cobalt naphthenate, lead octanoate, dibutyltin dilaurate, diamines, aminetin complexes, and the like. The drying compositions can be treated in the various ways familiar to the varnish and paint industries to produce special or advantageous effects.

The curable compositions of the instant invention are low viscosity liquids at temperatures ranging upwards from room temperature. These compositions are compatible with a wide variety of fillers and pigments which may be employed therein, if desired, to adjust the composition viscosity and at the same time enhance the physical properties of coatings formed therefrom. These compositions can be easily handled in such resin-forming applications as coating, bonding, laminating, molding, casting, potting and the like, without the need of solvents or diluents although such solvents or diluents can be used, if desired. In casting applications, the compositions can be made to fill small intricacies of molds without applying high pressures or heating to high temperatures. In coating applications, they can be easily spread, brushed, or sprayed on surfaces by the many techniques available to the paint, lacquer and varnish industries. These curable compositions undergo negligible shrinkage when cured and are particularly useful in bonding, castings molding and potting wherein undue shrinkage is particularly undesirable. Moreover, the compositions of this invention can be easily prepared using low temperatures at which no gelatin occurs during preparation. However, they can be cured rapidly at high temperatures. The pot-lives of the novel compositions can be controlled, as desired. These compositions can be made with relatively short pot-lives, of the order of a few minutes, with relatively long pot-lives, of the order of several hours or of several days, or with pot-lives of intermediate duration, as desired.

Coatings prepared in accordance with the instant invention are transparent and water-resistant. They can be made as tough, flexible, infusible products or as products having intermediate degrees of hardness and rigidity or toughness and flexibility, as desired. These resins can be machined to desired shapes and configurations and can be polished to provide appealing finishes. They can be made as infusible products which are resistant to most organic solvents. Furthermore, resins can also be made as products having high heat distortion values, and are capable of sustaining heavy loads at high temperatures. In accordance with this invention, resins having combinations of any one or several of these useful properties can be produced.

In reporting the physical properties of coatings prepared from the olefinically unsaturated ester isocyanates and various drying oils certain terms and tests were employed. These terms and tests are defined as follows:

(a) *ASTM Method.*—American Society for Testing Materials.

(b) *Diene Value.*—A measure of the degree of conjugation of unsaturated linkages in drying oils expressed in terms of the number of centigrams of iodine equivalent to the maleic anhydride used per gram of sample. Determined in accordance with the Method of Test for Maleic Diene Value of Drying Oils (ASTM D–1961–61).

(c) *Sward Hardness.*—A measure of the hardness of coatings. Determined in accordance with the procedure disclosed on page 432 of "Physical and Chemical Examination of Paints, Varnishes, Lacquers and Colors," Gardner-Sward, 12th edition, 1962.

The following examples are illustrative:

EXAMPLE 1

*Bis(2-aminoethyl) fumarate and dihydrochloride salt*

A mixture containing 97 grams (1.0 mole) of monoethanolamine hydrochloride, 49 grams (0.5 mole) of maleic anhydride in 436 grams of xylene was maintained at reflux temperature, i.e., about 138° C., while anhydrous hydrogen chloride was sparged through the mixture at a rate of 0.6 mole of hydrogen chloride per mole of anhydride per hour and by-product water was removed overhead. The theoretical quantity of water (9.0 cubic centimeters) was collected over a period of 15 hours and the residue product, bis(2-aminoethyl) fumarate dihydrochloride, isolated by filtration, washed with ether and methanol, and finally dried. 46 grams of the refined product was obtained which represented a 33 percent yield of the theoretical value. The bis(2-aminoethyl) fumarate dihydrochloride had a melting point of 197° C. and exhibited an infrared spectrum in agreement with that of the assigned structure.

Upon basification of the bis(2-aminoethyl) fumarate dihydrochloride, the free ester diamine is obtained.

EXAMPLE 2

*Bis(2-isocyanatoethyl) fumarate*

Phosgene was sparged through a slurry of 1067 grams (3.7 moles) of bis(2-aminoethyl) fumarate dihydrochloride in 9962 grams of ortho-dichlorobenzene at a rate of one mole per hour per mole of hydrochloride for a period of six hours. The temperature of the mixture was maintained at 140°–160° C. throughout the addition of the phosgene. Thereafter, the ortho-dichlorobenzene solvent was removed by distillation from the resultant clear solution and 937 grams of crude residue product, which represented 99 percent of the theoretical value, further refined by distillation. 800 grams of refined bis(2-isocyanatoethyl) fumarate was recovered which represented 85 percent of the theoretical value. The product had a boiling point of 147° C. at a pressure of 0.05 millimeter of mercury. Upon analysis the product had the following properties: Calculated for $C_{10}H_{10}O_6N_2$: C, 47.25; H, 3.94; found: C, 46.84; H, 4.07. Infrared spectrum was in agreement with that of the assigned structure with absorption maxima at $2.87\mu$ (overtone of $5.85\mu$ C=O), $3.25\mu$ (=CH—), $4.4\mu$ (N=C=O), $5.85\mu$ (ester C=O), $6.08\mu$ (C=C), and $7.85\mu$ and $8.05\mu$ (ester C=O).

EXAMPLE 3

*Bis(2-isocyanatoethyl) 5-norbornene-2,3-dicarboxylate*

To a stainless-steel rocker-type autoclave of 1000 cubic centimeter capacity was charged a mixture of 132 grams of cyclopentadiene, 126 grams of bis(2-isocyanatoethyl) fumarate and 200 milliliters of toluene. Thereafter the autoclave temperature was raised rapidly to 170° C. and maintained at 170°–175° C. for 5 hours, during which period rocking action was employed to facilitate mixing of the reactants. A maximum pressure of 95 pounds per square inch developed within the autoclave during the heating period. After the reaction was completed the crude product was first stripped free of solvent at a pressure of 100 millimeters of mercury, and subsequently stripped to a kettle temperature of 100° C. at a pressure of 1 millimeter of mercury in order to insure the complete removal of cyclopentadiene. The residue, comprising 171 grams, was purified by evaporative distillation through a falling-film type evaporator operated at 200° C. and a pressure of 0.05 millimeter of mercury. The distillate, 132 grams, was subsequently refined by vacuum distillation to afford 126 grams, representing 78.7 percent of the theoretical yield, of a colorless, odorless, mobile liquid having a boiling point of 146°–151° C. at a pressure of 0.08–0.15 millimeter of mercury and a refractive index, $n20/D$ 1.4950. Upon analysis the product had the following composition: Calculated for $C_{15}H_{16}N_2O_6$: C, 56.25; H, 5.00; N, 8.75; found: C, 55.47; H, 5.11; N, 9.02. An ethereal solution of the isocyanate reacted exothermally with an ethereal solution of aniline to furnish a crude bis(phenylurea) derivative which, following recrystallization from aqueous methanol, melted at 169.5°–170° C. Upon analysis the derivative had the following composition: Calculated for $C_{27}H_{30}N_4O_6$: C, 64.03; H, 5.93; N, 11.08; found: C, 63.97; H, 6.02; N, 11.08.

EXAMPLE 4

*Bis(2-isocyanatoethyl) 4-cyclohexene-1,2-dicarboxylate*

To a 1000 cubic centimeter capacity stainless-steel rocker-type autoclave was charged a mixture of 140 grams of bis(2-isocyanatoethyl) fumarate, 94 grams of 1,3-butadiene and 200 milliliters of commerical xylene (mixed isomers). The autoclave temperature was raised rapidly to 150° C. and maintained at this temperature for a period of 5 hours, rocking action being maintained throughout. Following completion of the heating period, the solvent was removed by distillation at a pressure of 50 millimeters of mercury and the residue was subsequently stripped to a kettle temperature of 110° C. at a pressure of 1 millimeter of mercury. Evaporative distillation of the kettle residue through a falling-film evaporator operated at 190° C. at a pressure of 0.1 millimeter of mercury afforded 132 grams of a straw-colored, liquid product. Subsequent refining by vacuum distillation furnished 122 grams, representing 72.0 percent of the theoretical yield of a colorless, odorless liquid having a boiling point of 146°–151° C. at a pressure of 0.12 millimeters of mercury and a refractive index, $n$ 30/D 1.4864. The infrared spectrum revealed bands at $3.25\mu$ (=CH—), $4.45\mu$ (—NCO), $5.8\mu$ (ester C=O), $6.06\mu$ (aliphatic C=C), 8.0 and $8.53\mu$ (ester C—O), and $15.2\mu$ (cis RCH=CHR). Upon analysis the product had the following composition: Calculated for $C_{14}H_{16}N_2O_6$: C, 54.54; H, 5.19; N, 9.08; found: C, 54.64; H, 5.29; N, 9.10. The bis(n-butylamine) derivative of this product was prepared and had a melting point of 99°–101° C. after two recrystallizations from aqueous ethanol. Upon analysis the derivative had the following composition: Calculated for $C_{22}H_{38}N_4O_6$: C, 58.15; H, 8.37; N, 12.33; found: C, 58.08; H, 8.49; N, 12.33.

EXAMPLE 5

*Bis(2-isocyanatoethyl) trans-9,10-dihydroanthracene-9,10-endo-α,β-succinate*

A mixture of 51 grams bis(2-isocyanatoethyl) fumarate, 36 grams of anthracene (90–95 percent purity) and 250 milliliters of 1,4-dioxane was heated for four days at reflux temperature, a blanket of nitrogen gas being maintained in the kettle throughout this time. The amber-colored solution which resulted was stripped of solvent at a pressure of 1–2 millimeters of mercury on a rotary evaporator, thereby leaving a reddish-orange highly viscous liquid which could not be induced to crystallize. Repeated batch-extraction with a 200 cubic centimeter portion of heptane at 75° C., followed by decantation of the heptane layer, cooling and filtration, afforded 1–2 grams per extraction of very fine white needles, having a melting point of 99°–101° C. Recrystallization from 50–50 benzene-heptane raised the melting point to 101.5°–103° C.

Upon analysis the product had the following composition: Calculated for $C_{24}H_{20}N_2O_6$: C, 66.66; H, 4.63; N, 6.48; found: C, 67.33; H, 4.69; N, 6.35. The bis(n-butylamine) derivative was prepared and found to have a melting point of 161°–162° C. following two recrystallizations from aqueous ethanol. Upon analysis the derivative had the following composition: Calculated for $C_{32}H_{42}N_4O_6$: C, 66.44; H, 7.26; N, 9.68; found: C, 66.58; H, 7.05; N, 9.41.

EXAMPLE 6

*Bis(2-isocyanatoethyl) 4-methylcyclo-hex-4-ene-1,2-dicarboxylate*

To a 1000 cubic centimeter stainless-steel rocker-type autoclave was charged a mixture of 127 grams of bis(2-isocyanatoethyl) fumarate, 136 grams of isoprene and 200 milliliters of commercial xylene (mixed isomers). The autoclave temperature was raised rapidly to 150° C. and maintained at this temperature for a period of 5 hours, rocking action being maintained throughout. Following completion of the heating period, the solvent was removed by distillation at a pressure of 50 millimeters of mercury and the residue was subsequently stripped to a kettle temperature of 110° C. at a pressure of 1 millimeter of mercury affording 141 grams of crude, pale-yellow liquid product which represented 82.4 percent of the theoretical value. Evaporative distillation through a falling-film evaporator operating at 180°–195° C., at a pressure of 0.04 millimeter of mercury followed by a refining distillation through a simple still-head produced a water-white liquid in a yield of 75.2 percent. The product had a boiling point of 150°–151° C. at a pressure of 0.08 millimeter of mercury and a refractive index, $n$ 30/D, 1.4856. Upon analysis the product had the following composition: Calculated for $C_{15}H_{18}N_2O_6$: C, 55.90; H, 5.59; N, 8.70; found: C, 56.57; H, 5.88; N, 8.63. Reaction of the product with n-butylamine produced a crystalline derivative which, following two recrystallizations from ethyl acetate, had a melting point of 101°–103° C. Upon analysis the derivative had the following composition: Calculated for $C_{23}H_{40}N_4O_6$: C, 58.80; H, 8.58; N, 12.02; found: C, 58.80; H, 8.52; N, 12.19.

EXAMPLE 7

*Bis(2-isocyanatoethyl) 4,5-dimethylcyclohex-4-ene-1,2-dicarboxylate*

A mixture of 36 grams of bis(2-isocyanatoethyl) fumarate, 19 grams of 2,3-dimethylbutadiene and 250 milliliters of xylene was heated at 145° C. for 5 hours in a 1-liter stainless steel bomb of the rocker type. Following solvent stripping, the residue was evaporatively distilled at 200° C. and at a pressure of 0.1 millimeter of mercury to afford 38 grams (80.8 percent yield) of water-white mobile liquid. Subsequent refining by vacuum distillation through a goose-neck still head produced, after a small forerun, 26 grams of product boiling at 161° C. at a pressure of 0.07 millimeter of mercury and having a refractive index, $n30/D$, 1.4912. Upon analysis the product had the following composition: Calculated for $C_{16}H_{20}N_2O_6$: C, 57.14; H, 5.95; N, 8.33; found: C, 56.75; H, 6.02; N, 8.51. Reaction of this product with n-butylamine gave a crude crystalline solid derivative melting at 126°–130° C. Recrystallization from ethyl acetate raised the melting point to 132° C. Upon analysis the derivative had the following composition: Calculated for $C_{24}H_{42}N_4O_6$: C, 59.75; H, 8.71; N, 11.62; found: C, 59.72; H, 8.79; N, 11.90.

EXAMPLE 8

One hundred parts by weight of tung oil and 60 parts of bis(2-isocyanatoethyl) fumarate dissolved in 106 parts of dry xylene were mixed in a dry reaction vessel fitted with a stirrer, an inlet tube for dry nitrogen, a thermometer and a variable take off distillations head. The mixture was heated under a dry nitrogen atmosphere to 140° C. and the xylene distilled. The temperature was raised to 150–160° C. and heating continued for an additional two hours. At the end of this period the mixture was cooled and 0.1 weight percent of dibutyl tin dilaurate catalyst added. A five mil wet film was cast on a glass plate and a hard, tough, wrinkled film resulted after 10–12 hours.

EXAMPLE 9

To 51 grams of Pentalyn A[1], was added 100 grams of oiticica oil and 50 grams of xylene. The stirred reaction mixture was heated to 130° C. and 81 grams of bis(2-isocyanatoethyl) fumarate added over a ten minute period. The reaction temperature was increased to 155° C. and heating continued for two hours and fifteen minutes. The reaction solution was diluted with mineral

---

[1] A registered trademark of Hercules Powder Company for a pentaerythritol ester of rosin suitable for varnish formulations.

spirits. The product at 70 percent non-volatiles had a viscosity of 300 centipoises. A 3 mil wet film cast with product containing 0.5 weight percent dibutyltin dilaurate and allowed to cure 7 days at room temperature and 50 percent relative humidity, gave a clear mar resistant coating having a Sward Hardness of 48 and a Gardner Impact of greater than 320 inch pounds.

EXAMPLE 10

To 75 grams of Pentalyn A was added 100 grams of oiticica oil. The stirred reaction mixture was heated to 150° C. and 81 grams of bis(2-isocyanatoethyl) fumarate added over a twenty-five minute period. The reaction solution was diluted with 110 grams of xylene and heating continued at 150° C. for an additional thirty minutes. A 4 mil wet film cast with product containing 0.1 weight percent dibutyltin dilaurate and allowed to cure seven days at room temperature and 50 percent relative humidity gave a clear, mar resistant coating having a Sward Hardness of 46 and a Gardner Impact of greater than 320 inch pounds.

EXAMPLE 11

To 100 grams of tung oil was added 50 grams of Pentalyn A. The reaction mixture was heated to 125° C. and 81 grams of bis(2-isocyanatoethyl) fumarate added over a twenty minute period. The reaction solution was diluted with 50 grams of xylene and heating continued an additional one hour and fifteen minutes at 120° C. A 3 mil wet film cast with product containing 0.1 weight percent dibutyltin dilaurate and allowed to cure 7 days at room temperature and 50 percent relative humidity gave a clear, mar resistant coating having a Sward Hardness of 50 and a Gardner Impact of greater than 320 inch pounds.

EXAMPLE 12

To 25 grams of the rosin acid ester of tricyclo-[4.3.1$^{2,5}$.0$^{1,6}$]undecane-4,8,9-triol was added 50 grams of oiticica oil and 25 grams of xylene. The reaction mixture was heated to 135° C. and 40 grams of bis(2-isocyanatoethyl) fumarate added over a ten minute period. The reaction temperature was increased to 145° C. and heating continued 1 hour and 45 minutes. Thereafter the reaction solution was diluted with 30 grams of xylene. A 4 mil wet film cast with product containing 0.5 weight percent dibutyltin dilaurate and allowed to cure seven days at room temperature and 50 percent relative humidity gave a clear mar resistant film having a Sward Hardness of 42 and a Gardner Impact of 7320 inch pounds.

EXAMPLES 13–16

Various drying oils and bis(2-isocyanatoethyl) fumarate dissolved in dry xylene were mixed in a dry reaction vessel and heated under conditions similar to those employed in Example 8. At the end of the heating period the mixture was cooled, 0.1 weight percent dibutyltin dilaurate added, and five mil wet films cast on glass plates and allowed to cure 7 days at room temperature. The drying oils employed, concentrations, and film properties are set forth in Table I below.

FILM PROPERTIES OF MOISTURE CURED OIL MODIFIED URETHANE COATINGS

| Example | Oil | Parts by Weight | Parts by weight of Isocyanate [1] | Sward Hardness | Water [2] | 1 Percent H$_2$SO$_4$ [2] |
|---|---|---|---|---|---|---|
| 13 | Dehydrated Castor Oil | 79.1 | 38.1 | 2 | Fair | Excellent. |
| 14 | ___do___ | 89.1 | 63.5 | 4 | ___do___ | Do. |
| 15 | Linseed Oil | 100 | 30 | 1.3 | ___do___ | Good. |
| 16 | Oiticica | 100 | 60 | 21.2 | ___do___ | Excellent. |

[1] Bis(2-isocyanatoethyl) fumarate.
[2] 24 hour exposure.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:
1. Bis(2-isocyanatoethyl) trans-9,10-dihydroanthracene 19,10-endo-$\alpha,\beta$-succinate.
2. Bis(isocyanatoalkyl) trans-9,10-dihydroanthracene-9,10-endo-$\alpha,\beta$-succinate wherein the alkyl moieties contained from 2 to 24 carbon atoms.
3. Bis(4-isocyanatophenyl) trans-9,10-dihydroanthracene 9,10-endo-$\alpha,\beta$-succinate.

References Cited by the Examiner
UNITED STATES PATENTS

| 2,940,985 | 6/1960 | Cords | 260—347.5 |
| 2,951,853 | 9/1960 | Matsui | 260—347.5 |
| 2,957,906 | 10/1960 | Erickson et al. | 260—347.5 X |
| 3,072,616 | 1/1963 | Wright et al. | 260—78.4 |
| 3,081,282 | 3/1963 | Mark | 260—78.4 |

ALEX MAZEL, *Primary Examiner.*

HENRY R. JILES, *Examiner.*

JAMES H. TURNIPSEED, *Assistant Examiner.*

UNITED STATES PATENT OFFICE
CERTIFICATE OF CORRECTION

Patent No. 3,275,679                      September 27, 1966

Thomas K. Brotherton et al.

It is hereby certified that error appears in the above numbered patent requiring correction and that the said Letters Patent should read as corrected below.

Column 4, lines 52 to 60, the left-hand portion of the formula should appear as shown below instead of as in the patent:

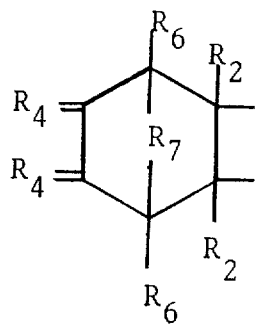

column 6, lines 3 to 12, the left-hand portion of the formula should appear as shown below instead of as in the patent:

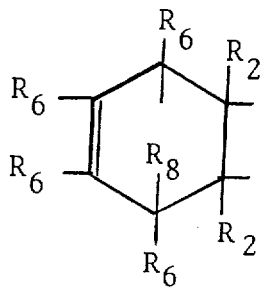

Signed and sealed this 19th day of November 1968.

(SEAL)
Attest:

EDWARD M. FLETCHER, JR.
Attesting Officer

EDWARD J. BRENNER
                                    Commissioner of Patents